Patented Nov. 29, 1949

2,489,373

UNITED STATES PATENT OFFICE 2,489,373

METHOD OF PREPARING A MOLDABLE COMPOSITION IN PELLET FORM

Eugene H. Gilman, Plainfield, N. J., assignor to Bakelite Corporation, a corporation of New Jersey No Drawing. Application May 4, 1944, Serial No. 534,151

8 Claims. (Cl. 260—37)

This invention relates to hot-molding compositions incorporating a thermosetting resin as a binder for filler particles. The filler is usually fibrous to impart strength to the molded pieces, but the invention applies as well to compositions having granular fillers.

Molding compositions are customarily prepared by blending a resin in powder form with the filler particles in a ball mill or the like. A mechanical blending, however, is not enough, for not only does such a mixture have an impractically low apparent density or high bulk factor, i. e. ratio of the mixture volume to the volume of a piece molded therefrom, but the resin and filler ingredients tend to segregate in handling and during the molding operation. It is therefore necessary that the resin and filler particles be made secure in the distributed form; and this is most commonly accomplished by milling the mechanically mixed resin and filler on hot rolls to partially fuse the resin particles with the filler particles. The operation results in a densified sheet that must then be ground to give a powdered molding material. But the grinding operation, and to some extent the hot-milling as well, restricts the filler to short fibers, such as wood flour, for any long fibers present become comminuted or ground in the operation. Moreover, in the grinding, there is produced a considerable percentage of dust and fines that must be sieved out of the material; while the fines can be reworked, there is the tendency in the repeated hot-milling for the resin to advance and lose the flow requisite for molding under normal operating conditions, and there are the disadvantages of extra cost, the inconvenience of handling the fine material, etc.

As intimated, densification of a molding mixture is a practical requirement, for molds are expensive to construct and molding powders with bulk factors corresponding to an apparent density of less than 0.3 to 0.4 are therefore undesirable to most molding. Retention of uniform resin-and-filler distribution under conditions of handling, shipping and molding is obviously another requirement. A further highly desirable feature in a molding powder is freedom from dust and from particles substantially smaller than about 100 mesh, but as a rule not larger than about 6 mesh, for cleanliness, pourability from preforming hoppers and ease of handling and molding.

According to the present invention, the foregoing requirements of a molding material are fulfilled by a processing that obviates milling on hot rolls by producing conglomerates, i. e. beads or pellets, directly from the mechanical mixture of the raw ingredients, i. e. resin and filler, and bringing within the desired range of sizes; it can be applied generally to mixtures including such fillers as wood flour, asbestos, cotton flock, granules, long loose fibers, chopped cord and fabric, etc., and the various types of heat-setting resins used in the molding industry such as the phenolaldehyde, urea-aldehyde, etc. in both solid and liquid forms. It is also possible by this invention to make use of the fines that result from hot-milling operations without destroying their useful flow and other molding properties. Furthermore, the beads or pellets can be obtained in a densified condition to conform to molding requirements, and this without the formation of hard lumps or nodules to interfere with a molding operation.

In brief, the invention depends upon incorporating in a resin (either powdered or liquid) and filler mixture a regulated amount of a substantially non-solvent liquid wetting agent that volatilizes in a subsequent drying operation, agitating the mixture with sufficient vigor or turbulence to form beads or pellets and then drying under conditions that maintain the pellet form and preferably with an agitation that secures a simultaneous densification of the beads or pellets. The beads or pellets so made are sufficiently coherent that they can be handled and poured without appreciable dusting, and because of their rounded or spheroidal shape they pour or flow readily through the orifice of a hopper of a preforming machine to be compressed into conventional preform shapes or they can be directly poured into a mold cavity for a molding operation.

As a wetting agent water is eminently satisfactory for resins that are in general use for preparing molding compositions, for it apparently has little if any solubilizing action but yet wets the resin powder surfaces (or extends a liquid resin) to impart a tackiness that causes coherence with filler particles under the impacts produced by agitation to give beads or pellets but not a stickiness that makes a more or less continuous viscous mass; but non-solvent hydrocarbon liquids, such as benzene, toluene, xylene, gasoline, mineral spirits, etc., can be substituted, especially for use with water-soluble phenolaldehyde and urea-aldehyde resins; and mixtures of non-solvent and solvent liquids (about 5 to 10 per cent of the latter, such as lower aliphatic alcohols or esters, glycols, ketones, etc.)

are useful to secure deeper penetration by the resin into a porous filler and particularly when the resin has been heat-advanced to a condition where its solubility is slight. The amount of liquid added regulates the average size of the pellets, but in general it is conveniently determined by gradually adding the liquid to a small sample of the resin and filler mixture (usually not more than an amount equal to the weight of the dry components), which upon agitation reduces to a crumbly mass that can be squeezed by hand into a firm ball, but without enough liquid added to make a slurry; adjustment in the proportion of agent added is made when resins in liquid form are used to include as part of the agent the volatile content of such resins. The percentage added to the sample fixes the amount to be used, and for a typical molding composition of about equal parts of wood flour and powdered heat-reactive phenol-formaldehyde resin the amount of water added is from about 30 to 60 per cent by volume to form pellets coming within the desired range of sizes; an excess addition of wetting agent causes the formation of a stiff dough, and with more of the agent a non-conglomerating slurry results, but these undesirable formations can be overcome by incorporating more of the resin-filler mixture or by driving off the agent as by evaporation.

The formation into beads or pellets occurs when the mass of resin and filler, brought to a crumbly state with the proper amount of wetting agent and agitation, is then further agitated. The extent and kind of agitation is dependent on the nature of the mixture and the pellet sizes desired. For instance, the typical wood flour and resin mixture with water added can be separated into beads or pellets by tumbling in a smooth drum. Better and more controlled results as to bead shapes and sizes, however, are obtained by means of a beading apparatus of the type disclosed in a patent to Glaxner, No. 2,065,-371, December 22, 1936, that consists of a stationary cylinder in which a shaft, carrying radially extending rods or spindles but modified to have the rods set helically about the shaft, rotates to agitate or create a turbulence in the mass that forms it into beads or pellets while simultaneously transferring the material toward the exit; this apparatus has the further advantages of insuring the formation of globular bodies and of being continuous in operation. Other types of agitators such as kneaders, ribbon blenders, pony mixers, etc., can also be used for conglomerating most types of mixtures.

Following the pelleting, the wetting agent is eliminated under controlled conditions of heating, etc. that do not destroy the individuality of the pellets or objectionably affect the flow and heat-reactivity of the resin; under these conditions there is provided a friable skin of relatively firm texture on a pellet. In the drying step it has been found unexpectedly that simultaneous agitation causes, instead of crushing or disintegration into the mixture components, a densification of the pellets to a degree that gives a satisfactory apparent density or bulk factor for molding and imparts a firmness for handling without any additional operation; for instance, vibratory tables, operated with sufficient force to cause a repetitive bouncing of the beads, can be used for the purpose. Apparently by the conjoint drying and agitation, the beads or pellets are impacted to drive the fibers and powdered resin particles or skins of liquid resin on the fibers or groups of fibers into more intimate contact while the wetting agent is being volatilized from and between the resin and fiber surfaces. This action can be accentuated by supplying heat for volatilizing the agent at a temperature and for a period of time that causes limited fusion on the resin surfaces; such heating is further advantageous in that it can be used to partially advance the resin ingredient and so speed up its hardening to the infusible state in a molding operation. The drying operation is preferably continued until the content of the agent is reduced as a rule to about two per cent. Upon cooling the conglomerates become hard and rigid.

The shapes and sizes of the pellets vary according to the percentage of water, processing and the types of fillers. Short fiber and granule fillers, such as wood flour, ground cotton flock, powdered mica, asbestos flock, etc. can be obtained in rounded or speroidal pellets as small as 100 mesh with the preferred pellet sizes ranging from 6 to 100 mesh because within that range the pellets pour rapidly through the hoppers of the usual preforming machines. Long fibers, such as cotton, etc., and chopped threads, paper, fabric and the like, tend to form elongated or pebble-like conglomerates which may average one-half inch in length or diameter depending upon the original lengths and areas of the individual filler elements; such long fiber conglomerates are primarily intended for the molding of articles requiring high impact strengths.

Molding material fines, such as are produced in the hot-milling of resin-filler mixtures, are found to lend themselves to the processing described as such or as additions to resin-filler mixtures. Used alone, they require merely mixing with water in proper amount and, when agitated in a tumbler or other mixer, form rounded conglomerates that can be dried and densified at temperatures below the resin-reaction temperature, and so without undue advancement of the resin content, to yield moldable pellets; applying somewhat higher temperatures to soften the particles in a conglomerate while agitating yield stronger and firmer beads or pellets.

The invention is illustrated by the following examples; the additions of conglomerating liquid are given in percentages by volume, rather than by weight since the fillers vary greatly in the former respect.

*Example 1.—(a)* For the preparation of molding pellets from a mixture of short fiber filler and resin, the modified Glaxner pelletizer, described above, is preferred because of the control of pellet sizes that it provides; the sizes can be varied by the spacing of the radial spindles or rods, speed of rotation and proportion of wetting agent included. To illustrate, about a half-and-half mixture of wood flour and powdered heat-reactive phenol-formaldehyde resin was simultaneously fed with water into the charging end of a cylinder, fitted with spindles about 1.5 inches apart on the shaft and the shaft rotated at about 325 R. P. M., to form a moist mass of 45 per cent water content. The mass emerged at the discharge end in the form of self-supporting but crushable pellets that were mostly in the 16 to 100 mesh size, and when dried at room temperature, they had an apparent density of about 0.30. But, when dried at about 80° C., or the temperature of incipient fusion of the resin, and upon a vibratory impact table, the apparent density was increased to 0.50 and higher, and the pellets were hard and tough without dusting. Articles molded from the pellets had good gloss and impact values of about 0.184 foot-pound (E. T. B., i. e. energy-to-break).

(b) When the same wood flour and resin mixture was charged into an open-end rotating tumbler and about the same percentage of water was sprayed on the mass as it was tumbled, pellets were formed that were strong enough to resist crumbling when dried on a vibrating table.

(c) In a kneader operation, it was found that more care was required to avoid the merging of the pellets into a continuous mass; but by utilizing heat to cause partial evaporation of the moisture during the kneading, there were obtained rounded pellets that had an apparent density of 0.44 and most of them fell within a range of 16 to 100 mesh; upon further drying under agitation and cooling the pellets were sufficiently hard and rigid for handling.

*Example 2.*—Molding materials that contain granular fillers such as barytes, silicates, metal oxides, powdered mica, etc., to impart heat-resistance or electrical properties, can by this invention be made into dust-free beads or pellets of about the same pourability and apparent density as powdered molding material made from the same ingredients by the hot-rolling and grinding method.

(a) A ball-milled mixture of about 65 parts by weight of ground mica and about 35 parts of a powdered heat-reactive resin was placed in a tumbler that was rotated while about 32 parts of water were sprayed on the mass. The conglomerates formed in a few minutes, and the agitation was continued until the pellets were compact and smooth; they were then dried in an oven. About half the pellets were larger than 8 mesh, ranging up to 0.25 inch in diameter, and most of the remainder were within the 8 to 80 mesh size, in contrast a typical hot-milled and ground molding material, having the same mica and resin content, consisted of particles none greater than 16 mesh and more than 25 per cent were finer than 80 mesh and largely dust.

(b) Graphite is frequently an added filler component to function as a dry lubricant in bearings, casters, door ferrules, etc. By the hot-milling process the percentage of graphite in a molding material is kept below 15 per cent, since the graphite interferes with the hot-rolling by preventing adhesion, and even wood flour added to reduce the lubricating effect does not overcome the dustiness and irregularity of the hot-rolled mixture when ground. By forming conglomerates it becomes possible to use graphite alone as a filler, as was demonstrated by the preparation of a mixture of about equal parts of powdered heat-reactive resin and graphite which was agitated in a tumbler while about 35 per cent of water was sprayed on the mass with the immediate formation of pellets; continued agitation gave smooth and rounded pellets, and the conglomerates were dried by exposure to air. The pellets were sufficiently firm to be sieved without dusting, and they ranged in size from 8 to 100 mesh with an apparent density of 0.674 and fast pourability. Such compositions when molded are poor in strength, but they are greatly improved in this respect when they include fiber filler as well as graphite.

*Example 3.*—Fibers long enough to overlap to contribute impact strength and occurring in the form of loose long fibers, or fibrous elements such as threads, cords, cut fabric, etc., can be made into rounded or elongated beads or pellets.

(a) Cotton flock is particularly objectionable as a filler in molding materials made by the hot-milling and grinding method in that it yields a dusty as well as a light, fluffy material of low apparent density (about 0.25) i. e. a high bulk factor (about 5.5); in the pellet form, made without hot rolling and grinding, the apparent density and impact strengths are greatly improved. To illustrate, cotton flock of 20 to 30 mesh, ball-milled with dye and lubricant, was agitated in a tumbler or rotating cylinder, and during agitation it was sprayed with an equal weight of resin solids contained in a liquid water-soluble phenol-aldehyde resin diluted with water so that the total water content added was about 35 per cent of the entire mixture. A sticky mass resulted that adhered to the cylinder wall though a small proportion of beads were formed. But scraping the mass from the wall and spraying with non-solvent benzene as the mass was agitated caused a conversion into non-sintering beads; the beads were dried in an oven. They ranged in size from substantially 6 to 100 mesh with an apparent density of 0.34; articles molded therefrom had an impact value of 0.412 foot pound (E. T. B.).

(b) Cotton shearings, consisting of fibers over one-half inch in length, were ball-milled with a powdered heat-reactive phenol-formaldehyde resin and some dye and lubricant, and the fluffy mass was transferred to a rotating open-end inclined container. About 50 per cent of water was added and the mass was tumbled. Substantially the whole mass broke into rounded conglomerates of an average size of ⅜ inch diameter, and they were dried by exposure to heat from infra red lamps while agitated. The apparent density was low, being 0.230, but the molded articles had an impact value of 1.80 foot pounds (E. T. B.); in comparison the same filler and resin by the hot-rolling and grinding method gave the fluffy material with an apparent density below 0.2 and impact value of 0.7 to 0.8 foot pound (E. T. B) in the molded piece.

(c) Asbestos fibers, averaging one-half inch in length were dry-mixed with about one-half their weight of ground heat-reactive phenol-aldehyde resin and a small amount of lubricant, and the mixture was agitated in a rotating cylinder while about 30 per cent of water was sprayed on. Conglomerates formed quickly into smooth surface pellets, and they were discharged into pans and dried in an oven. The conglomerates were hard and dust-free, about 50 per cent were retained on an 8 mesh screen and substantially all ranged within the 6 to 20 mesh sizes; the apparent density was 0.604. They molded in the usual time and pressure cycle into articles of good surface and shock resistance with an impact value of 0.50 foot pound (E. T. B.).

*Example 4.*—The utilization of molding material fines resulting from hot-milling and grinding is a most useful feature of this invention. While, as indicated above, the fines themselves can be rolled and impacted into pellets, it is preferable to utilize them in conjunction with raw resin-filler mixtures.

(a) About 720 parts of ground hot-rolled material, made from equal parts of powdered heat-reactive resin and cotton flock (30 mesh), and about 115 parts of resin-wood flour fines (finer than 80 mesh) were first mixed in a rotating blender, and then water was continuously sprayed on the agitated mixture until about one-third of the composition was water. The conglomerates began forming with the first water addition, and at the end the entire contents were in the form of soft, moist pellets. The agitation was continued to densify the pellets, and they were then discharged into a rotary drier through which gases at about 200 to 300° F. were forced. The heat caused sintering of the resin, and this action together with the continued impact of the drier gave densified pellets that were substantially free from moisture. The rounded pellets were hard enough to resist crushing by the fingers and they ranged in size mostly from 8 to 40 mesh; they had an apparent density of 0.400 to 0.460, and free pourability in preforming machines in which they are compressed to form conventional preform shapes. Articles molded from the pellets had average Izod impact values of 0.26 foot pound (E. T. B.) and smooth surface finishes.

(b) In the foregoing the cotton flock-resin mixture was first hot-rolled and ground. By dispensing with the hot-rolling and using the raw mixture of cotton flock and resin to which the wood flour fines were added, pellets were obtained of slightly lower apparent density, but they molded into articles of greater impact value. A ball mill was loaded with 23 parts by weight of cotton flock (30 mesh), 23 parts of heat-reactive phenol-formaldehyde resin and 54 parts of wood flour-resin fines, and the mixture was milled into a dusty fluffy mass. The mass was charged into a tumbler, and about 40 to 60 per cent of water was sprayed on or until the entire mass had converted into pellets less than 0.25 inch in diameter; continued agitation rounded the pellets into spheroidal shape and they were then dried. The apparent density was about 0.375, but this varied according to the drying, whether in open air or in an oven on an impact drier. The pellets were pourable through a preforming machine hopper and produced conventional preform shapes which were molded into articles having impact values averaging about 0.36 foot-pound (E. T. B.).

When coarser mesh cotton flock was substituted, pellets of less apparent density were obtained, but the pieces molded therefrom had higher impact values; a ⅛ inch mesh cotton flock gave pellets having an apparent density of 0.20 and impact values of 0.75 foot-pound in the molded pieces, and a 1/16 inch mesh cotton flock gave pellets having an apparent density of 0.30 and impact values of 0.41 foot-pound in the molded pieces.

From the foregoing disclosure and examples, it is apparent that the present invention requires no shaping by compressing a wet mass, such as occurs in extrusion or other forms of cold-molding, into continuous bodies that must then be comminuted or ground for drying in order to prepare a generally useful molding material; such comminuted or broken materials, unless finely ground, further necessitate tumbling or some other attrition action to round the corners and edges for pourability and flow, and finely-ground material is unsuited for machine-preforming because of its caking propensities. The desirability of molding material, moreover, in rounded pellet form is demonstrated by the increased strength observed in molded pieces; for instance, a ground hot-rolled molding material, comprising granules of 16 to 80 mesh size, was molded into articles that had average tensile strengths of about 7000 pounds per sq. in., but, when the 80 mesh and finer size granulations of the same molding material were formed into pellets of 16 to 80 mesh, the molded pieces had tensile strengths of about 8500 pounds per square inch.

What is claimed is:

1. Method of preparing a moldable and preformable composition in rounded pellet form which comprises mixing together filler and thermosetting resin with enough volatile substantially non-solvent liquid to form a crumbly mass compactible into a coherent body, compacting the crumbly mass by turbulent agitation into coherent individual rounded pellets small enough to pour through hopper orifices of preforming machines, and drying the pellets at a temperature retaining fusibility of the resin for a molding operation while densifying the pellets by repetitively bouncing them.

2. Method of preparing a moldable and preformable composition in rounded pellet form, which comprises mixing together fibrous filler and powdered thermosetting resin with enough volatile substantially non-solvent liquid to form a crumbly mass compactible into a coherent body, compacting the crumbly mass by turbulent agitation into coherent individual rounded pellets small enough to pour through hopper orifices of preforming machines, drying and densifying the pellets by repetitively bouncing the pellets at a temperature retaining fusibility of the resin for a molding operation.

3. Method of preparing a moldable and preformable composition in rounded pellet form which comprises mixing filler and liquid thermosetting resin with enough volatile substantially non-solvent organic liquid to form a crumbly mass compactible into a coherent body, compacting the crumbly mass by turbulent agitation into individual coherent rounded pellets small enough to pour through hopper orifices of preforming machines, and then densifying and drying the pellets by repetitively bouncing them at a temperature retaining fusibility of the resin for a molding operation.

4. Method of preparing a moldable and preformable composition from thermosetting molding material fines which comprises mixing the fines with enough water to form a crumbly mass compactible into a coherent body, compacting the crumbly mass by turbulent agitation into individual coherent rounded pellets small enough to pour through hopper orifices of preforming machines, and then drying the pellets at a temperature retaining fusibility of the resin for a molding operation while densifying the pellets by repetitively bouncing them.

5. Method of preparing a pelleted moldable and preformable composition from thermosetting resin and overlapping fiber filler which comprises mixing the resin and fiber filler with enough volatile substantially non-solvent liquid to form a crumbly mass compactible into a coherent body, compacting by turbulent agitation the crumbly mass into individual coherent rounded pellets small enough to pour through hopper orifices of preforming machines, and then densifying and drying the pellets by repetitively bouncing them at temperatures retaining fusibility of the resin for a molding operation.

6. Method of preparing a molding composition in rounded pelleted form capable of being preformed which comprises mixing together filler and heat-reactive resin in a pelletizer, spraying the mixture with enough non-solvent liquid to form a crumbly mass compactible into a coherent body, mixing and compacting the crumbly mass in the pelletizer into individual coherent rounded pellets small enough to pour through hopper orifices of preforming machines, removing the pellets from the pelletizer and drying the pellets at a temperature retaining fusibility of the resin for a molding operation while densifying the pellets by repetitively bouncing them.

7. Method of preparing a moldable and preformable molding composition in rounded pellet form which comprises mixing together comminuted water-insoluble thermosetting resin and granular filler with 30 to 60 per cent by volume of water to form a crumbly mass compactible into a coherent body, compacting the crumbly mass into individual coherent rounded pellets small enough to pour through hopper orifices of preforming machines and then drying the pellets at a temperature retaining fusibility of the resin for a molding operation.

8. Method of preparing molding material in rounded pellet form, which comprises mixing together fibrous filler and comminuted thermosetting resin with enough volatile liquid substantially a non-solvent for the resin to form a wet crumbly mass, compacting the crumbly mass by turbulent agitation into individual coherent pellets small enough in size to pour freely through hopper orifices of preforming machines, simultaneously densifying and drying the wet pellets by repetitively bouncing them while heating them to the sintering temperature of the thermosetting resin.

EUGENE H. GILMAN.

REFERENCES CITED

The following references are of record in the file of this patent:

UNITED STATES PATENTS

| Number | Name | Date |
| --- | --- | --- |
| 1,223,216 | Talley | Apr. 17, 1917 |
| 1,330,444 | Grunwald | Feb. 10, 1920 |
| 2,020,024 | Francisco | Nov. 5, 1935 |
| 2,067,941 | Nash | Jan. 19, 1937 |
| 2,064,487 | Miller | Dec. 15, 1937 |
| 2,213,577 | Cordier | Sept. 3, 1940 |
| 2,229,291 | Groten et al. | Jan. 21, 1941 |
| 2,369,110 | Harford | Feb. 6, 1945 |